United States Patent [19]

Greenbaum

[11] 4,231,187
[45] Nov. 4, 1980

[54] AGRICULTURAL DEVICE HAVING AIR-WATER-SOIL STRATA

[76] Inventor: George Greenbaum, 790 Boylston St., Boston, Mass. 01299

[21] Appl. No.: 961,669

[22] Filed: Nov. 17, 1978

[51] Int. Cl.³ .............................................. A01G 27/00
[52] U.S. Cl. .......................................... 47/80; 47/39; 47/59; 47/81
[58] Field of Search ...................................... 47/79–81, 47/39, 59

[56] References Cited

U.S. PATENT DOCUMENTS

| | | | |
|---|---|---|---|
| 665,502 | 1/1901 | Boggs | 47/80 |
| 1,222,648 | 4/1917 | Marks | 47/80 X |
| 2,030,268 | 2/1936 | Radley | 47/80 |
| 2,084,005 | 6/1937 | Richards | 47/80 |
| 2,803,091 | 8/1957 | Radford | 47/80 |
| 2,865,137 | 12/1958 | Longacre | 47/80 |
| 3,220,144 | 11/1965 | Green | 47/80 |
| 3,866,351 | 2/1975 | Cobia | 47/81 |

FOREIGN PATENT DOCUMENTS

| | | | |
|---|---|---|---|
| 4005 | 1/1901 | Austria | 47/80 |
| 16377 | 1/1882 | Fed. Rep. of Germany | 47/80 |
| 1024483 | 1/1953 | France | 47/80 |
| 1502101 | 10/1967 | France | 47/80 |
| 474211 | 8/1969 | Switzerland | 47/80 |

Primary Examiner—Robert E. Bagwill
Attorney, Agent, or Firm—Thompson, Birch, Gauthier & Samuels

[57] ABSTRACT

An agricultural device which comprises three strata of soil air and water. The soil is retained on a permeable floor and spaced apart from the water. The floor is supported by hydrophilic columns which are received in the water. Water is transmitted through the hydrophilic columns, generally with air, and introduced into the soil. The columns may or may not extend into the soil.

4 Claims, 12 Drawing Figures

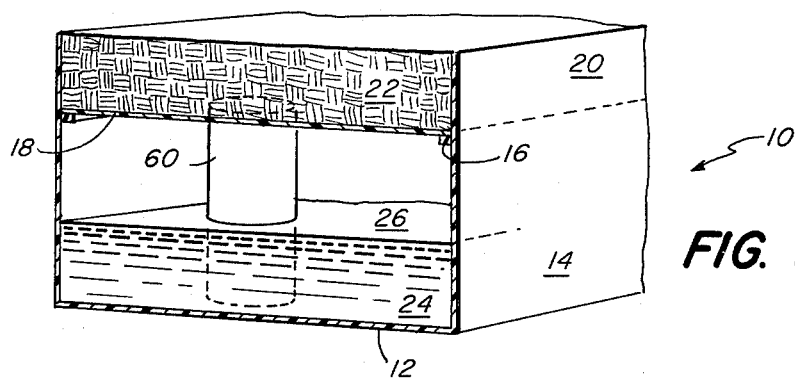
FIG. 1
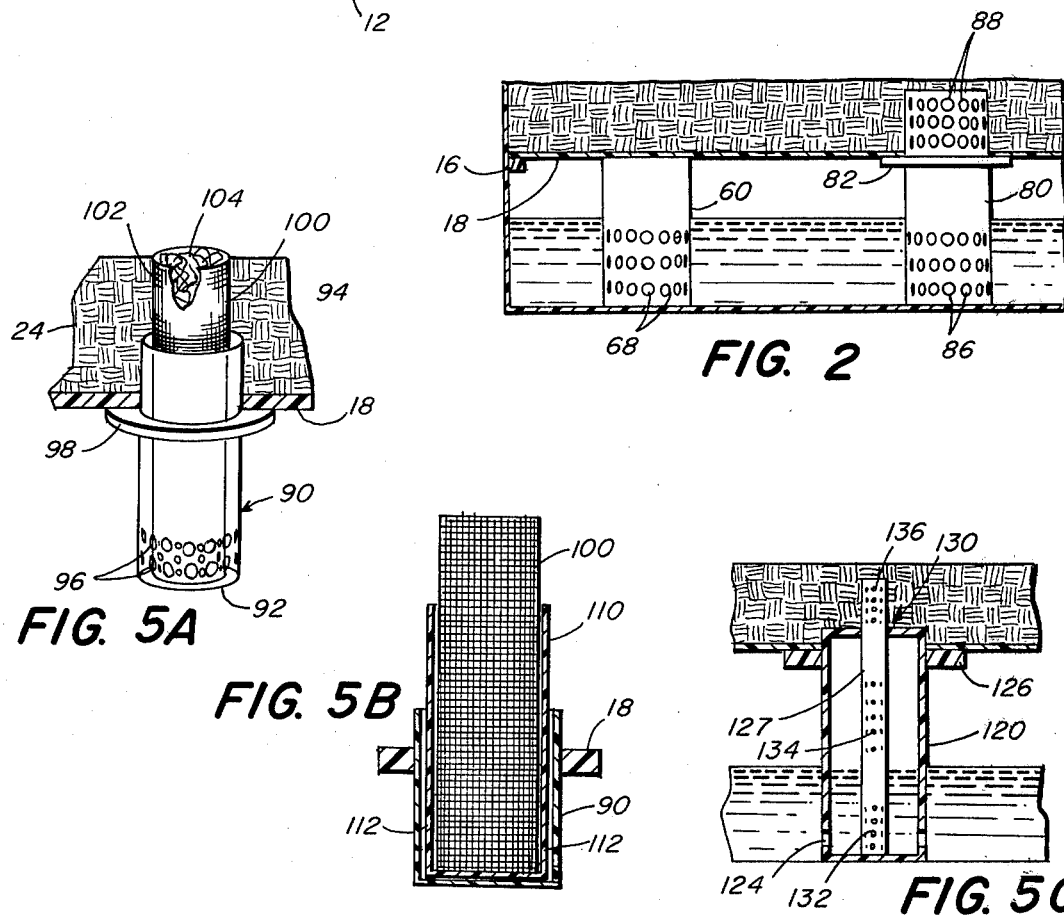
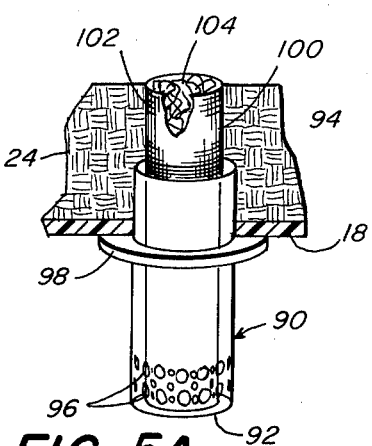
FIG. 5A
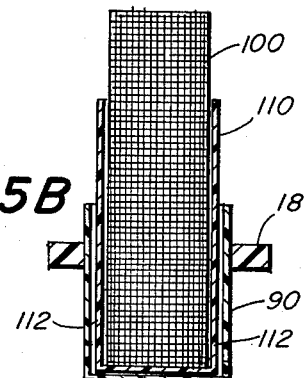
FIG. 5B
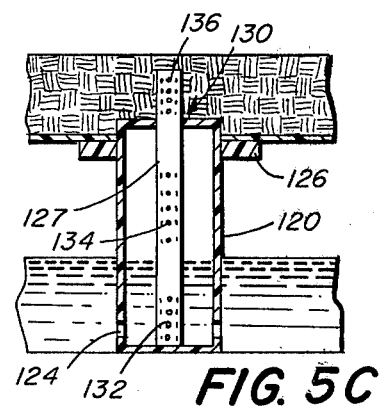
FIG. 5C
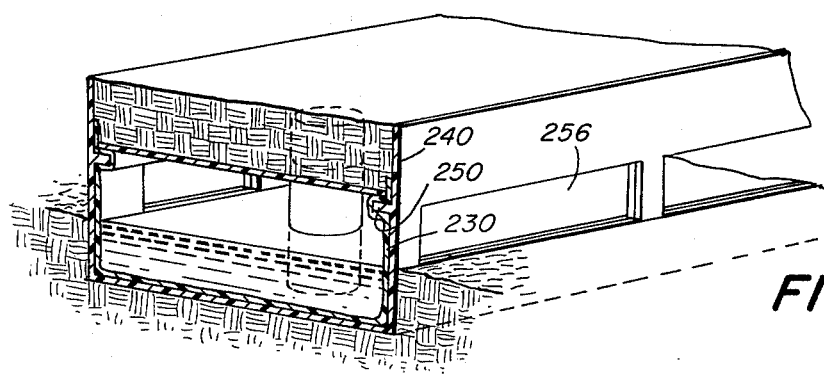
FIG. 7

AGRICULTURAL DEVICE HAVING AIR-WATER-SOIL STRATA

BACKGROUND AND BRIEF SUMMARY OF THE INVENTION

Attempts to provide a satisfactory device for growing plants on large scale have not been entirely successful. Many patents have issued to myself which are directed to the use of various structures to enhance the utilization of air and water with a plant support system. Although these devices are satisfactory for home and greenhouse use they have not been readily adapted to large scale use.

The attempts to utilize air have been directed primarily to various structures to increase the surface area in which the root system of the plant is disposed. Attempts to utilize water including the addition of nutrients, herbacides, fertilizers etc. have employed various metering arrangements to maintain the soil in a moistened condition.

To date it appears that none of these devices have been adapted to wide scale agricultural use. There still exists a need for a suitable system which would be effective at low cost.

My present invention is directed to establishing separate strata of soil, air and water with hydrophilic columns providing for liquid transfer from the water stratum through the air stratum and into the soil stratum.

Many patents have issued wherein the soil which supports the plant is retained in one structure while water is retained in another structure. U.S. Pat. Nos. 4,040,207 and 4,034,506 show such structures where the floor supporting the soil is in contact with water. U.S. Pat. No. 2,486,512, discloses the use of an absorbent material or a wick to transmit water to the soil. U.S. Pat. No. 2,346,029 also discloses the use of an absorbent material or a wick to transmit water to the soil.

Broadly my invention provides a device and method which uniquely enhances the relationship among soil-air-water. In my invention the concept of aeration is granted equal prominence with water to maximize plant growth.

My invention is directed to an agricultural device having a first strata of soil or plant support material, the soil supported on a permeable floor; a plurality of hydraulically conductive columns hereinafter referred to as hydraulic columns support the floor and are received on an impermeable base, water is disposed on the base and maintained at a level such that the upper surface of the water is spaced apart from the lower surface of the permeable floor to define an air stratum therebetween. The hydraulic columns transport the water from the liquid stratum through the air stratum and into the soil stratum. In this application the term soil or plant support material means any growing medium which can support the plant being grown. Because of the relatively small volume of soil required, the depths of the soil on the floor can be controlled closely and other additives can be included to accommodate the specific needs of the soil for optimum growing conditions. For example, to achieve maximum root aeration vermiculite or a similar material may be mixed in for improved air permability.

The term water as used in this application includes water with or without additives, such as nutrients, dissolved gas, disease control agents, hormones, root conditioners, etc. which influence the plant growth and which additives can be dissolved in the water, colloidally suspended, etc.

In a preferred embodiment of my invention the base includes sides which define a reservoir to hold the water. The hydraulic columns or support members are received on the base and support, at least in part, the permeable floor on which the soil is disposed.

The method of my invention includes contacting the hydraulic column with water, flowing the water through the column and into the soil and controlling the rate of flow of the water.

BRIEF DESCRIPTION OF THE DRAWINGS

FIG. 1 is a perspective view of one embodiment of my invention;

FIG. 2 is a front elevation of an embodiment of my invention utilizing columns of different heights;

FIGS. 5a, b and c are front views of alternative embodiments of the hydraulic columns of my invention employing removable cartridges;

FIG. 7 is a perspective view of a further embodiment of the invention wherein the sides of the base are apertured to allow light to enter the reservoir.

DESCRIPTION OF THE PREFERRED EMBODIMENT

Figure 3:
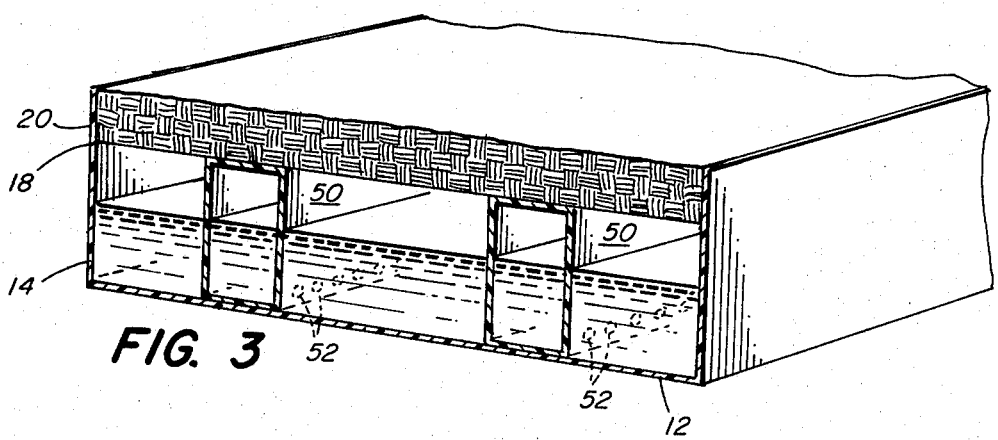
FIG. 3 is a perspective view of an alternative embodiment of my invention wherein the columns are configured as long, rectangular blocks.

Referring to FIG. 1, an embodiment of my invention is shown generally at 10 and comprises a base 12 having sides 14 which extend upwardly. Opposed lips 16 are formed on the top inner surfaces of the sides 14. Received on the lips 16 is a permeable floor 18. Walls 20 extend upwardly from the sides 14 and combine with the floor 18 to receive soil 22. End plates (not shown) are sealed to the edges of the sides 14 and walls 20 to retain water 24 and the soil 22 therein. In FIG. 1, the sides 14 of the reservoir and the walls 20 joined to the floor are of a unitary construction. However, they may be separately formed if desired.

The base 12 and sides 14 define a reservoir which contains the stratum of water 24. The floor 18 together with the sides 20 define a tray to receive the stratum of soil 22. The upper surface of the water 24 and the floor 18 define a stratum of air 26.

Hydraulic columns 60 (FIG. 4a), only one shown in FIG. 1, are randomly and/or uniformly received on the base 12 and contact in fluid transfer and supporting engagement the undersurface of the floor 18.

The column 60, which will be described in detail for FIG. 4, intersects the water-air-soil strata and transmits the water through the air stratum 26 and into the soil 22. The floor 18 which is partially supported by the lips 16 is primarily supported by the column(s) 60. The floor is fluid permeable where it engages the column(s) in supporting and fluid-transfer relationship. The remainder of the floor is either fluid impermeable or preferably only air permeable.

FIG. 2 is an arrangement similar to that described for FIG. 1. A column 60 is shown together with a column 80 (FIG. 4c) having a collar 82 secured thereto. The use of the collar 82 on the column allows the column 80 to extend through the floor 18 into the soil thus increasing the transfer of water and air into the soil 22.

In FIG. 3, the base 12 and sides 14, floor 18 and walls 20 define the water-air-soil strata. Instead of the cylindrical columns to transport the water and air as shown in FIGS. 1 and 2, long, flat rectangular members 50 are used. The member 50 is hollow and is filled with a hydrophilic material. Apertures 52 are formed in the lower portion thereof and the member is open at the top. The hydrophilic material contacts the permeable floor 18, whereby the water may flow through the apertures 32 into the hydrophilic material disposed in the member 50 through the floor and into the soil. This embodiment is uniquely suited for growing crops in rows.

Various embodiments of columns are shown in FIG. 4. To control the water quality, water and air quantity and availability into the soil, several parameters may be controlled, such as size and spacing of apertures, number of columns, and type of hydrophilic material used. It is important to understand that the columns transport both water and air. The hydraulic action of the column ensures the transport of water and the nature of the hydrophilic material determines the amount of air flow. If interconnected cellular material is used, the flow will depend upon the size of the connected cells; if particulate or sintered material is used the flow will depend on the interstices, for fibrous material the density, etc.

Figure 4A:
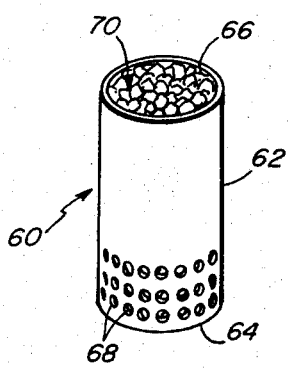
FIGS. 4a, b and c are front views of various embodiments of the hydraulic columns used in my invention.

In FIG. 4a the column 60 comprises a sleeve-like hollow cylinder 62 with a closed bottom 64 and open top 66. The lower portion is characterized by a plurality of apertures 68. The cylinder is filled with a hydrophilic material 70 such as soil, vermiculite, peat moss, SUPER-SLURPER ® membrane material such as would remove salt from saline water, resin exchange materials, etc. Alternatively, simple water conducting materials such as fabric wicking or open-cell foams may be used per se, particularly those organic foams or cellular materials where the open cells represent over 90% of the cells. For example, the materials may comprise inorganic or cellular foam of flexible, semi-rigid or rigid type such as urethane, vinyl, or elastomeric foams. Such materials are readily available and need not be described in detail. The size, shape and array of the apertures, whether uniform or nonuniform may vary as desired. The number of the columns used, whether symmetrically or nonsymmetrically arranged and the types of columns either engaged to the undersurface of the floor or extending into the soil may be varied.

Figure 4B:
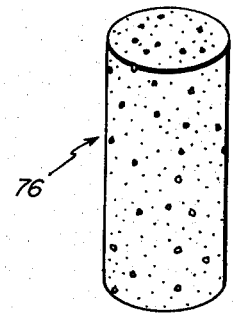

In FIG. 4b a cylindrical shaped column 76 is shown which may comprise a dimensionally stable interconnected cellular material such as foamed polystyrene, polyethylene, etc. This type of column 76 may be used per se without being received in a cylindrical sleeve.

Figure 4C:
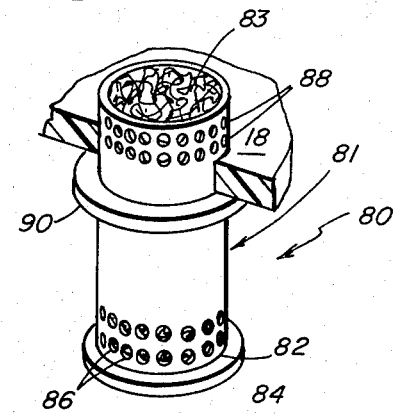

In FIG. 4c, the hydraulic column 80 is shown and comprises a sleeve-like hollow cylinder 81 terminating with a closed bottom 82 having a flanged foot 84 extending therefrom. A plurality of apertures 86 are formed in the bottom portion thereof. The upper portion of the column 80 extends through an opening in the floor 18 and is received in the soil. This provides for direct introduction of water into the soil bed. Apertures 88 are formed in the upper portion above the floor 18. A collar 90 is formed with the column 80 and supports the floor as shown. The column 80 is filled with a hydrophilic material 83.

In the operation of the invention, referring to FIG. 2, water flows through the apertures 68 of the column 60, and 86 of the column 80, through the hydrophilic material 70 and 83 respectively and into the floor 18. The permeable floor 18 where it contacts the column 60 may be any hydrophilic material, as described above either structurally integral per se or supported on a permeable support such as a screen, hardware cloth or the like. For the column 60 the water flows through the floor 18 and into the soil 24. For the column 80 the water flows through the apertures 88 and into the soil 24. Air also flows directly through the permeable floor 18. This would be particularly true if the column of FIG. 4b were used in place of the column 80. Of course air would always be present in the columns 60 and 80 and the hydrophilic material not being supersaturated air would flow through the apertures 88.

The floor 18 may assume a configuration other than planar such as a corrugated floor, or a floor having a plurality of V's in aligned or non-aligned relationship and the V's may be uniformly or non-uniformly arrayed either on the upper and/or lower surfaces.

The material of construction of the floor 18 and walls 20 is basically of such strength that when used for containing the soil it can retain between its opposed walls the soil in a wetted condition together with the forces acting on the walls by any plant which may be growing in the soil.

Similarly, the base 12 and sides 14 can retain therebetween the water without being deformed beyond their elastic limits. Any high and low density polyethylene, high impact styrene, concrete, etc. may be used.

The floor is preferably air permeable and may be of any conventional material such as a sieve, porous-ceramic or glass, or sintered material, cellular material consisting essentially of interconnected individual cells of the open cell or breathable type that permits passage of a gas therethrough by a tortuous path.

In FIG. 5 further alternative embodiments of the hydrophilic columns such as shown in FIGS. 4a and 4c are illustrated.

In FIG. 5a, a sheath-like cylindrical column 90 includes a closed bottom 92 with apertures 96 formed on the lower portion of the column and an open top 94. An outwardly extending flange 98 engages the lower surface of a floor 18. A cartridge-like member 100 is inserted into the column 90. The member 100 comprises an outer wire mesh 102 within which is disposed a hydrophilic material 104. With this embodiment depending upon the amount of water to be transferred to the adjacent soil replaceable cartridge members 100 of differing flow characteristics may be readily inserted into the column 90. The interchangeability of such members provides flexibility. For example, if it were desired to remove deleterious materials, such as salt from the water, then the appropriate membrane material or ion-exchange resin could be used in the cartridge.

In FIG. 5b a hollow cylindrical sleeve 110 having apertures 112 at the lower portion thereof but not at the upper portion, is received in the cylinder 90 and the member 100 is received in sleeve 110 whereby the height or location of introduction of the water into the soil may be easily controlled by the sleeve 110. For example, where the depth of the soil is fixed, say at 8 inches, at one period it may be desirable that the water essentially be dispersed throughout the entire 8 inches.

In this instance the upper portion of the member (as with the extending portions of the cylinders described above) would be exposed throughout the entire depth of the soil. By the use of the inner sleeve 110 the depth at which the liquid will flow outwardly into the soil bed can be controlled. In FIG. 5b the upper portion of the soil will be wetted but the sleeve 110 will prevent direct wetting of the lower portion.

In FIG. 5c an embodiment further illustrates the ability of my invention to direct water and air to a specific root zone. A cylindrical sleeve 120 has a closed bottom 122 with apertures 124 at the lower end and a collar 126 which engages the floor 18. The column 120 extends into the soil 24 at its upper end and into the water 22 at its lower end. A tube 130 is received in the sleeve 120. The tube has three sets of apertures 132 in the water stratum, 134 in the air stratum and 136 in the soil stratum with non-apertured portions 127 therebetween. Both water and air thus flows into the soil at the desired location of the root zone. Alternatively a structurally integral hydrophilic material can be used.

Figure 6:
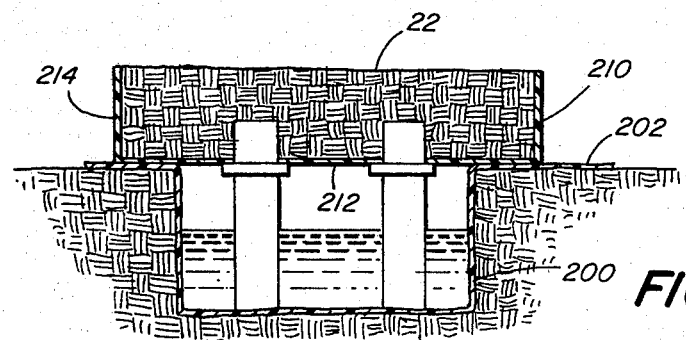
FIG. 6 is a front view of a further embodiment of my invention wherein the reservoir is formed in a trench formed in the soil.

In FIG. 6 a trench 200 is formed in the soil and lined with an impermeable plastic film 202, the upper portions of the film overlaying the ground. Water is introduced into the lined trench 200. A trough-like box 210 having a permeable floor 212, and walls 214 containing soil 22 is received on the ground engaging the laterally extending portions of the sheet material to hold it in a fixed position. Hydrophilic columns such as described for FIG. 4c are received on the sheet material and extend into the soil.

FIG. 7 is an alternative embodiment of FIG. 6 wherein sides 230 and walls 240 are joined at their edges and include inwardly extending lips 250 such as described for FIG. 1. The sides are partially received in the ground. A polyethylene sheet material 252 is received between a floor 242 and the lips 250 and is thereby secured. Openings 256 are formed in the sides to allow flow of the air and particularly light into the water and air strata.

Figure 8:
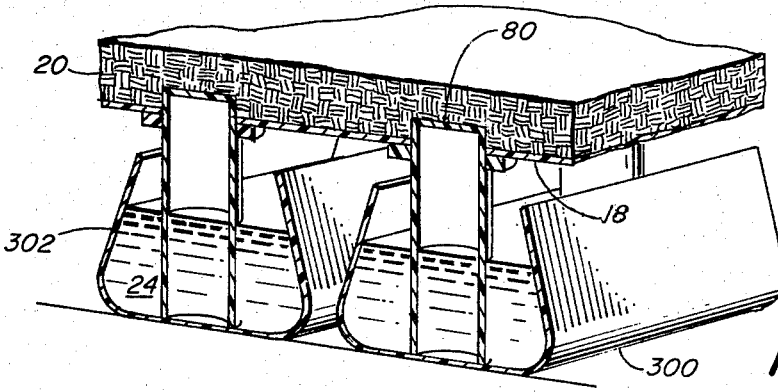
FIG. 8 is a perspective view of a channel-like configuration of an embodiment of my invention.

Referring to FIG. 8 a channel-like configuration is shown at 300. A trough-like channel with inwardly sloping opposed walls 302 defines the reservoir which contains the water 24. Columns 80 support the floor 18 having sides 20 as described above. This embodiment is uniquely adapted for use where water is scarce.

Any of the columns described may be used in any combination of the embodiments described.

Having described my invention what I now claim is:

1. An agricultural device which comprises
    (a) a reservoir having a base and sides adapted to receive a strata of water;
    (b) a soil bed having a fluid permeable floor and walls defining a stratum of soil and defining between the soil stratum and the water stratum an air stratum, each distinct from the other;
    (c) a sheath-like cylindrical column, the lower end thereof being fluid permeable and received in the base of the reservoir, the column including a flange secured thereto and supportingly engaging the floor, the column extending through the floor and into the soil bed, the column including an open upper end lying in a plane substantially parallel to the floor
        a removable porous walled cartridge member received in the column in non-sealing engagement therewith, the cartridge member comprising hydrophilic material and extending from the bottom of the column to beyond the upper end of the column whereby water is transferred through the cartridge member at a rate and amount dependent upon the material in the cartridge member into the soil bed.

2. The device of claim 1 wherein the cartridge member includes an outer wire mesh to retain the hydrophilic material.

3. The device of claim 1 which includes a sleeve slidably received between the cartridge member and the column which sleeve extends upwardly into the soil bed and the cartridge member is disposed therein whereby the sleeve controls the area of disbursement of the water to the soil bed.

4. The device of claim 1 wherein the cartridge member is an integrally formed dimensionally stable hydrophilic material.

* * * * *